United States Patent [19]
Mizuochi et al.

[11] Patent Number: 5,400,163
[45] Date of Patent: Mar. 21, 1995

[54] MULTIPLEX DIGITAL COMMUNICATION SYSTEM FOR TRANSMITTING CHANNEL IDENTIFICATION INFORMATION

[75] Inventors: Takashi Mizuochi; Susumu Sato; Hiroshi Ichibangase; Tadayoshi Kitayama, all of Kanagawa, Japan

[73] Assignee: Mitsubishi Denki Kabushiki Kaisha, Tokyo, Japan

[21] Appl. No.: 788,454

[22] Filed: Nov. 6, 1991

[30] Foreign Application Priority Data

Nov. 21, 1990 [JP] Japan .................................. 2-316540
Dec. 26, 1990 [JP] Japan .................................. 2-414498

[51] Int. Cl.6 ............................................ H04J 14/02
[52] U.S. Cl. .................... 359/124; 370/121; 370/85.7
[58] Field of Search ............... 359/124, 132, 133, 134, 359/191, 192; 370/121, 71, 76, 85.7

[56] References Cited

U.S. PATENT DOCUMENTS

| | | | |
|---|---|---|---|
| 4,797,879 | 1/1989 | Habbab | 359/121 |
| 4,916,705 | 4/1990 | Glance | 359/191 |
| 4,989,200 | 1/1991 | Olshansky | 359/192 |

FOREIGN PATENT DOCUMENTS

| | | | |
|---|---|---|---|
| 0296609 | 12/1988 | European Pat. Off. . | |
| 0302112 | 2/1989 | European Pat. Off. . | |
| 62043231 | 8/1985 | Japan . | |
| 0147437 | 6/1989 | Japan | 359/191 |
| 91539 | 11/1989 | Japan . | |
| WO88/04507 | 6/1988 | WIPO . | |

OTHER PUBLICATIONS

H. J. Chao "A 140 Mbit/s CMOS LSI Framer Chip for a Broad-Band ISDN Local Access System" IEEE Journal of Solid State Circuits 2/88.
Yamazaki, et al "A Coherent Optical FDM CATV Distribution System" Journal of Lightware Technology Mar. 1990.
S. Kitajima et al, "A Novel Optical Tunning Scheme Using Beat Counting Method for Optical Frequency-Division Multiplexing Transmission," The Transactions of the Institute of Electronics, Information and Communication Engrs. 1990, pp. 4-176.
T. Okita, "Problems of Analog Optical Transmission System," 1989 Optical Transmission Systems Symposium, Dec. 1989, pp. 9-14.

*Primary Examiner*—Leslie Pascal
*Attorney, Agent, or Firm*—Wolf, Greenfield & Sacks

[57] ABSTRACT

Multiplex communication system for transmitting different signals through a plurality of channels comprises a transmitter and a receiver. The transmitter comprises a transmitting section for multiplexing and transmitting the different signals through the plurality of channels, and an adder for adding channel identification signals for identifying the respective channels to the signals to be transmitted through the respective channels. The receiver comprises a setting device for setting a desired channel, a detector for detecting the channel identification signals from the signals transmitted from the transmitter, and a channel selector for selecting the channel signal preset by the setting device in accordance with the outputs of the setting device and the detector.

6 Claims, 11 Drawing Sheets

MULTIPLEX DIGITAL COMMUNICATION SYSTEM FOR TRANSMITTING CHANNEL IDENTIFICATION INFORMATION

BACKGROUND OF THE INVENTION

1. Field of the Invention

The present invention relates to a multiplexed digital communication system for transmitting channel identification information, and particularly to a multiplex communication system which enables a desired channel to be selected by users from frequency-multiplex or time-division-multiplex channels.

2. Description of the Prior Art

It is known to utilize frequency-division multiplex technology and time-division-multiplex technology for transmitting a multichannel video signal to a receiving side from a transmitting side.

Figure 1:
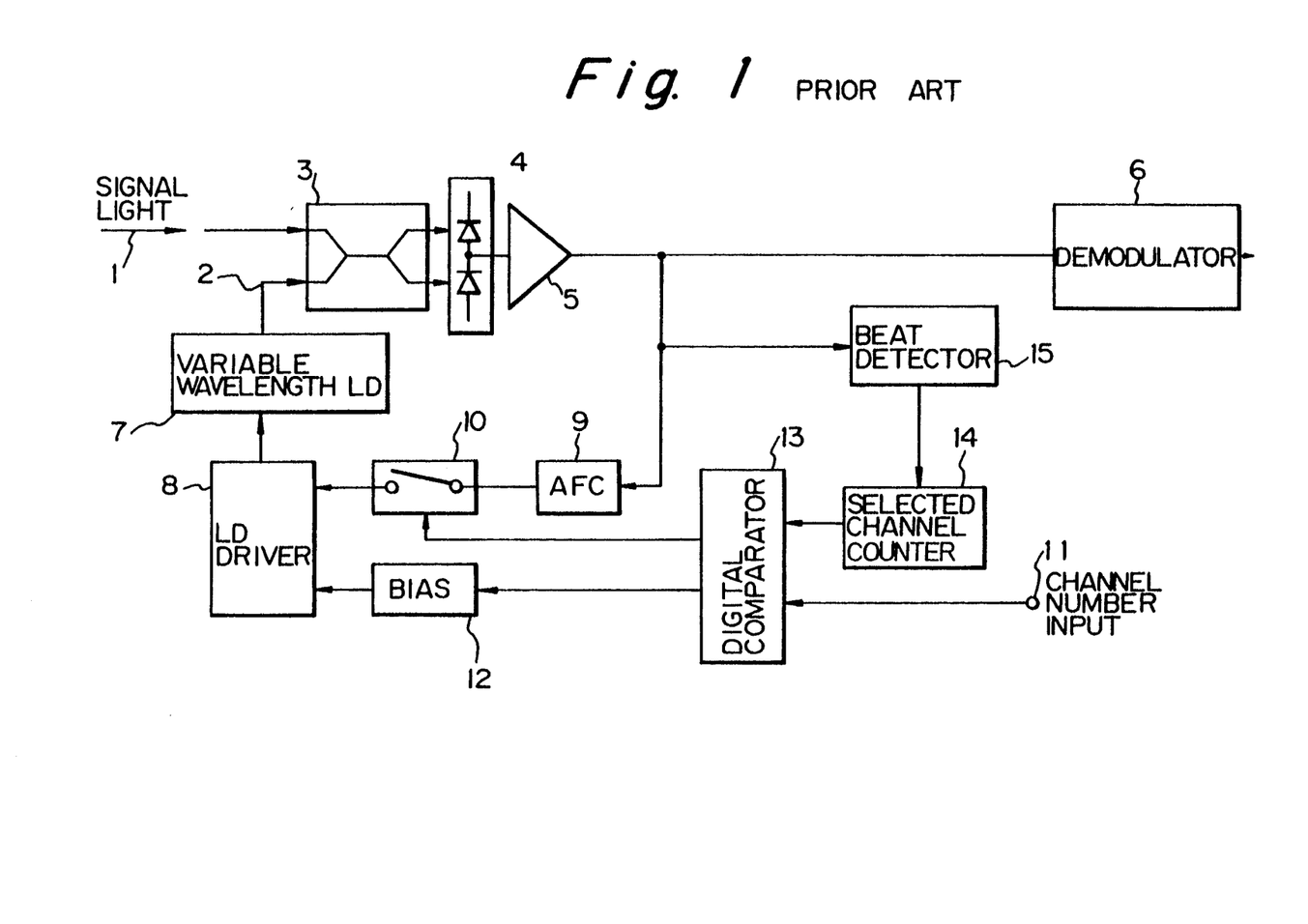
FIG. 1 is a block diagram indicating the construction of a conventional frequency-division multiplex coherent optical communication system.

FIG. 1 is a block diagram indicating the construction of a frequency division multiplex coherent optical communication system, disclosed in "Beat Count Tuning Method for Optical Frequency-Division-Multiplex Transmission" by Kitajima, et al., "Proceedings of the Spring National Convention of the Electronics, Information and Communication Society in Japan, 1990", Article No. B-997.

In this figure, the reference numeral 1 denotes a signal beam of a certain channel; 2 a local oscillation frequency beam; 3 a photo coupler; 4 a photo sensor; 5 an intermediate frequency amplifier; 6 a demodulator; 7 a variable wavelength LD (laser diode) for outputting local oscillation frequency beam 2; 8 a drive circuit for driving LD 7; 9 an AFC (Automatic Frequency Control) circuit; 10 a switch; 11 a channel number input terminal; 12 a bias circuit; 13 a digital comparator; 14 a selected channel counter; and 15 a beat detector. Digital comparator 13 is provided with a register at an input terminal.

An operation of the system will next be explained. When a desired channel has been selected, switch 10 is closed and AFC circuit 9 controls a current to be applied to variable wavelength LD 7 in order to stabilize the intermediate frequency. When a channel number to be selected is input to digital comparator 13 through input terminal 11, a difference between the currently selected channel number and the target channel number is output from digital comparator 13. Depending on this output, switch 10 is turned OFF and a bias signal applied to LD 7 is scanned toward the target channel by bias circuit 12. Beat detector 15 outputs a pulse signal corresponding to the number of channels to be scanned until the target channel is obtained. Selected channel counter 14 counts the pulse signals sent from beat detector 15. When the channel number counted by beat detector 15 becomes identical to the target channel number, switch 10 is turned ON by an output from digital comparator 13 and the scanning of the bias signal is stopped. Finally, the intermediate frequency of the target channel is locked by AFC circuit 9, thereby ensuring stable reception of the target channel.

Figure 2:
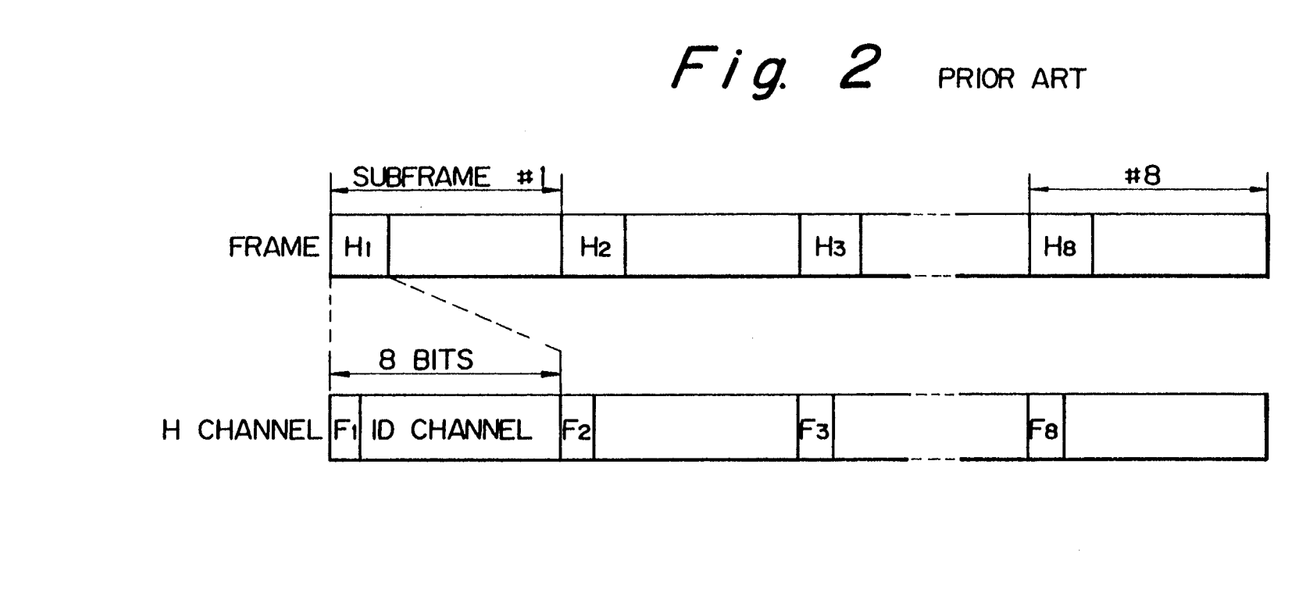
FIG. 2 is a diagram indicating a frame format used in a conventional time-division multiplex communication system.

Next, the channel identification in a TDM system will be explained. FIG. 2 indicates a frame format in the time division multiplex communication system disclosed in the Japanese Patent Public Disclosure No. 91534/1989. A frame is composed of eight subframes and the leading one word of each subframe is used as frame synchronization channel (H channel). Identification information (ID channel) of the frame synchronization channel is inserted in unused seven bits of each H channel. When the channel identification information inserted in the transmitting side is read in the receiving side, it can be detected which channel is currently being received.

Therefore, a desired channel can be finally received by sequentially reading the channels to control the read operation to reduce a difference between receiving and target channel numbers.

Figure 3:
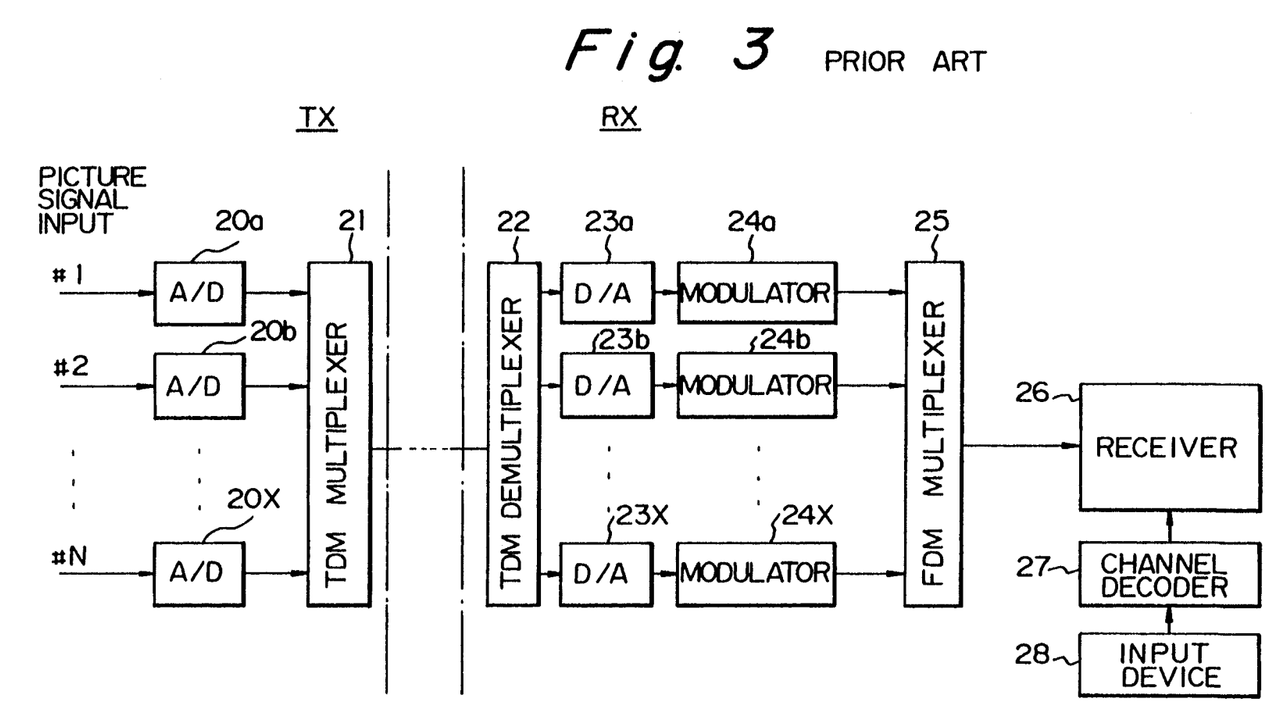
FIG. 3 is a diagram indicating the construction of a conventional time-division multiplex video signal transmitting system.

FIG. 3 is a block diagram of the construction of the time-division-multiplex video signal transmission system disclosed on pages 9 to 14 of the 3rd Optical Communication System Symposium Material (edited by Authorized Committee for Optical Communication System Research of the Electron, Information and Communication Society in Japan, December 1989).

In FIG. 3, the reference numerals 20a–20x denote a plurality number N of A/D converters for converting multi-channel analog video signals (#1, #2, . . . , #N) sent from the head end to digital video signals. These converters comprise low-pass filters for removing a high frequency spectrum which is not related to the video signal. The reference numeral 21 denotes a TDM multiplexing apparatus which time-division-multiplexes the outputs of A/D converters 20a–20x; 22 a TDM signal demultiplexing apparatus which executes functions reverse to those of apparatus 21; 23a–23x a plurality number N of D/A converters for converting the demultiplexed digital video signals of the respective channels to analog video signals; 24a–24x N modulators for frequency-modulating the analog signals; 25 an FDM multiplexing apparatus for generating a frequency-division-multiplex signal from the outputs of N modulators 24a–24x; 26 a video signal receiver; 27 a channel decoder for generating a channel selection signal; and 28 an input unit for channel selection.

Figure 4:
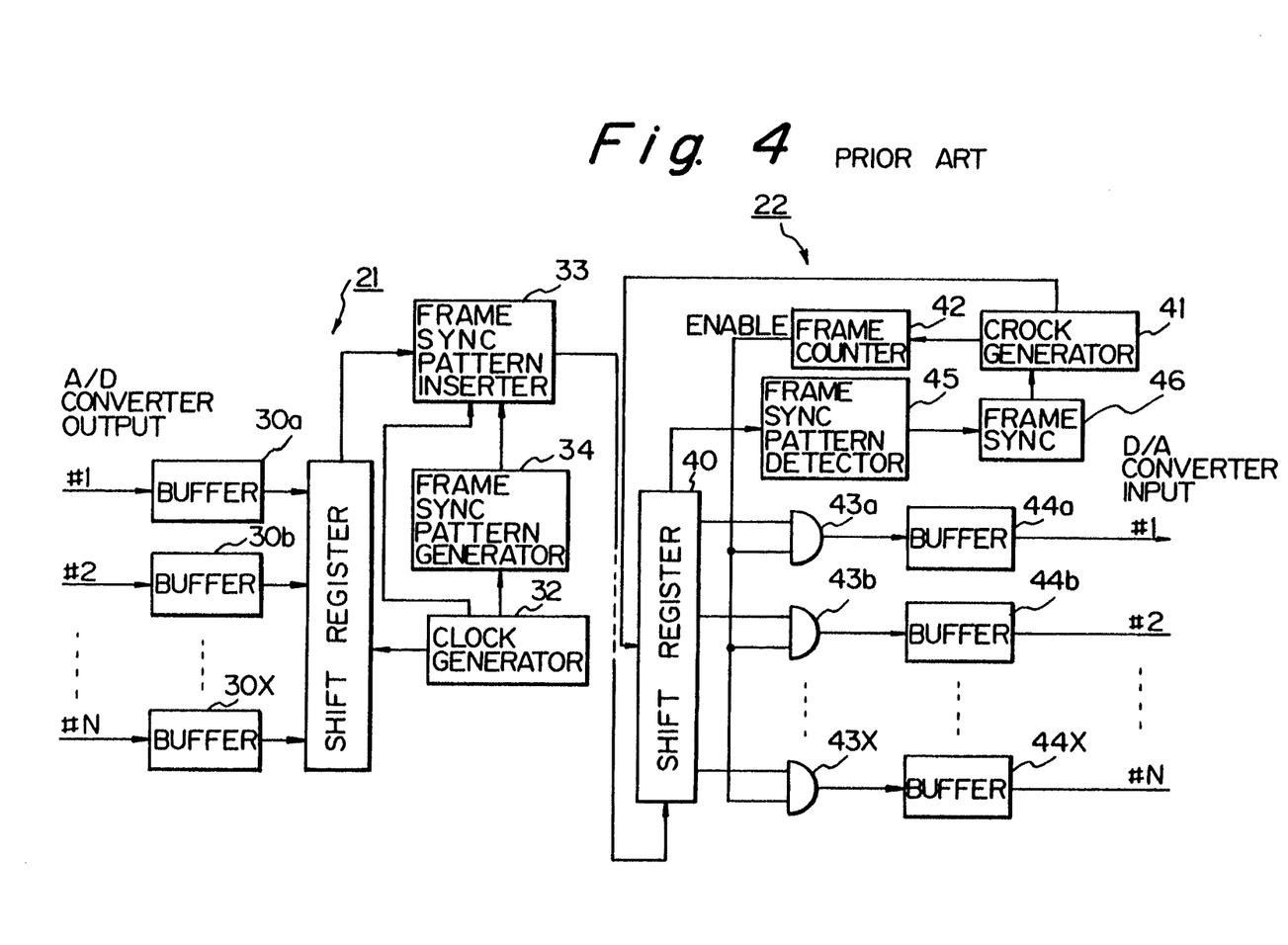
FIG. 4 is a diagram indicating detail constructions of a TDM multiplexing apparatus and a TDM signal demultiplexing apparatus shown in FIG. 3.

FIG. 4 is a diagram showing in detail constructions of TDM multiplexing apparatus 21 and TDM signal demultiplexing apparatus 22. In FIG. 4, 30a–30x are N input buffers provided for the respective channels; 31 a shift register for converting a parallel signal input from the buffers to a serial signal; 32 a clock generator; 33 a frame synchronization pattern inserter; 34 a frame synchronization pattern generator; 40 a shift register for converting a serial input signal to a parallel signal; 41 a clock generator for extracting a clock element from an input signal; 42 a frame counter; 43a–43x AND circuits for controlling the timing to output the demultiplexed signals; 44a–44x output buffers; 45 a frame synchronization pattern detector; and 46 a frame synchronization circuit.

An operation of the system will next be explained.

As shown in FIG. 3, in the case of multiplexing, for example, N-channel video signals, parallel N-channel input video signals are respectively converted to digital signals by M-bit A/D converters 20a–20x. These digital signals are then converted to a time-division-multiplex signal by TDM apparatus 21 and are transmitted to the transmission line as a serial video signal. On the other hand, the received video signal is separated into each channel by TDM signal demultiplexing apparatus 22. The demultiplexed video signals of the respective channels are input to M-bit D/A converters 23a–23x and then converted to analog signals. These analog signals are then frequency-modulated by modulators 24a–24x, frequency-division multiplexed by FDM apparatus 25, and then sent to video signal receiver 26 as RF signals. A desired video signal can be obtained in video signal receiver 26 as explained hereunder. An input signal from input unit 28 is decoded to a channel selection signal by channel decoder 27. An oscillation frequency of a local oscillation circuit within video signal receiver 26 is changed depending on the channel selection signal to tune to one channel of the received RF signals. In this manner, the baseband signal of the selected channel is regenerated and a video signal is displayed on receiver 26.

In TDM multiplexing apparatus 21 and TDM signal demultiplexing apparatus 22 shown in FIG. 4, pieces of data of the respective channels are input in parallel to shift register 31 through input buffers 30a–30x in the transmitting side. The contents of shift register 31 are read sequentially from channel #1 to channel #N under the control of clocks output from clock generator 32. A frame synchronization pattern generated in frame synchronization pattern generator 34 is inserted in the output of shift register 31 in frame synchronization pattern inserter 33 and a TDM signal thus prepared is then transmitted to the transmission line as a serial signal.

In the receiving side, a received serial signal is input to shift register 40. The contents of the shift register 40 are sequentially shifted under the control of clocks output from clock generator 41. When the data of the respective channels have been shifted to the normal position, an output-enable signal is output from frame counter 42 and AND circuits 43a–43x open, whereby the pieces of data of the respective channels are output through output buffers 44a–44x.

The received signal is also sent to frame synchronization pattern detector 45 through shift register 40. A frame synchronization pattern is here detected, frame synchronization circuit 46 establishes the frame synchronization, and the clock synchronized with the detected frame synchronization pattern is output from clock generator 41.

The conventional frequency-division-multiplex coherent optical communicate system shown in FIG. 1 malfunctions when, for example, a certain channel other than the channel to be selected is in a silent state or when the receiving level is temporarily lowered to prevent the beat detector from detecting a beat signal, and cannot recover to the normal condition unless the system is reset. Moreover, the system as a whole is made complicated due to the necessity for a beat detector.

In addition, a method of inserting a channel number merely enables identification of the channel currently received, and all channels existing between the channel being received and the target channel must be received sequentially and the target channel number must be compared with a received channel number until the target channel has been selected.

In the time-division-multiplex signal transmission system explained with reference to FIGS. 3 and 4, a demultiplexing operation is performed in all channels in the receiving side and thereafter channel selection is carried out after the D/A conversion, FM modulation and frequency-division multiplex for each channel. This makes the scale of circuits very large.

In addition, the quality of a received image is deteriorated due to the troublesome processing including D/A conversion followed by FM modulation, FDM, FDM signal demultiplexing and FM modulation.

SUMMARY OF THE INVENTION

The present invention has been proposed to overcome the problems explained above, and it is therefore an object of the present invention to provide a multiplex communication system which can accurately select a desired channel regardless of the conditions of other channels without sequentially receiving all channels.

In order to attain the object described above, the present invention provides a multiplex communication system for transmitting different signals through a plurality of channels, comprising:

transmitting means comprising a transmitting section for multiplexing and transmitting the different signals through the plurality of channels, and adding means for adding channel identification signals for identifying the respective channels to the signals to be transmitted through the respective channels; and receiving means comprising setting means for setting a desired channel, detecting means for detecting the channel identification signals from the signals transmitted from the transmitting means, and channel selecting means for selecting the channel signal preset by the setting means in accordance with the outputs of the setting means and the detecting means.

In the first embodiment of the present invention, the present invention is embodied as a frequency-division multiplex communication system comprising:

transmitting means comprising a frequency-division multiplex transmitting section for frequency-division multiplexing and transmitting digital signals of a plurality of channels to the transmission line in the form of frame, and inserting means for inserting carrier information for identifying the respective channels to predetermined areas of the respective frames; and receiving means comprising a receiving section for receiving the frequency-division multiplexed digital signals from the transmitting line, reading means for reading the carrier information out of the digital signals received by the receiving section, setting means for setting a desired channel, and oscillating means for oscillating a frequency determined by the outputs of the reading means and the setting means, thereby receiving the digital signal of the channel preset by the setting means using the frequency produced by the oscillating means.

In this frequency-division multiplex communication system, the digital signals are transmitted from the transmitting means to the receiving means by light, and the oscillating means comprises a variable wavelength laser diode which radiates a local oscillation laser beam. The receiving section comprises a photo-coupler which receives a signal beam transmitted from the transmitting means at one input and also receives the local oscillating signal beam transmitted from the laser diode at another input, arithmetic means responsive to the outputs of the reading means and the setting means for outputting the signal for computing an oscillation frequency of the laser diode required to extract the signal of the channel preset by the setting means so as to output a signal which designates the oscillation frequency, and driving means for driving the laser diode in accordance with the designating signal.

The frequency-division multiplex communication system further comprises a memory storing a relationship between the oscillation frequency of the laser diode and a current driving the laser diode. The arithmetic means is a microprocessor which computes a frequency to be oscillated by the laser diode in response to the outputs of the setting means and the reading means to output the designating signal by reading a current corresponding to the oscillation frequency from the memory.

In the first embodiment of the present invention, the identification signal is given to each channel and a control signal is given corresponding to the channel to be selected. Therefore, channel selection is mainly carried out by the control signal.

The second embodiment of the present invention relates to a time-division multiplex communication system for transmitting digital signals of a plurality of channels in the form of a frame, comprising:

transmitting means comprising an identification signal inserting section for inserting, to the frames of the channels, identification signals for identifying the channels for transmitting the digital signals and multiplexing means for time-division multiplexing the signals including the identification signals, thereby transmitting such multiplexed signals to the transmitting line; and receiving means comprising a receiving section for receiving the time-division multiplex digital signals sent from the transmission line, detecting means for detecting the identification signals from the digital signals received from the receiving section, setting means for setting a desired channel, and selecting means for selecting the desired channel in response to the outputs of the detecting means and the setting means, thereby receiving the digital signal of the channel preset by the setting means.

In the time-division multiplex communication system, the selecting means decides whether the output of the detecting means coincides with the output of the setting means. When these outputs coincide, the output of the receiving section is extracted, but, if both outputs do not coincide, the output of the receiving section is shifted until both outputs coincide.

In the second embodiment of the present invention. The selecting means provided in the receiving side selects a digital signal, the channel identification information of which coincides with an input selection channel, from received multiplex digital video signals. Therefore, it is no longer necessary to multiplex and demultiplex an input signal for each channel, and accordingly, the number of processing steps can be reduced and signal distribution can be realized with small circuits.

The above and other objects and features of the present invention will become more obvious from the explanation given hereunder with reference to the accompanying drawings.

BRIEF DESCRIPTION OF THE DRAWINGS

FIGS. 10, 10A and 10b are block diagrams indicating the construction of a digital tuner of FIG. 9.

DETAILED DESCRIPTION OF THE PREFERRED EMBODIMENTS

Figure 5:
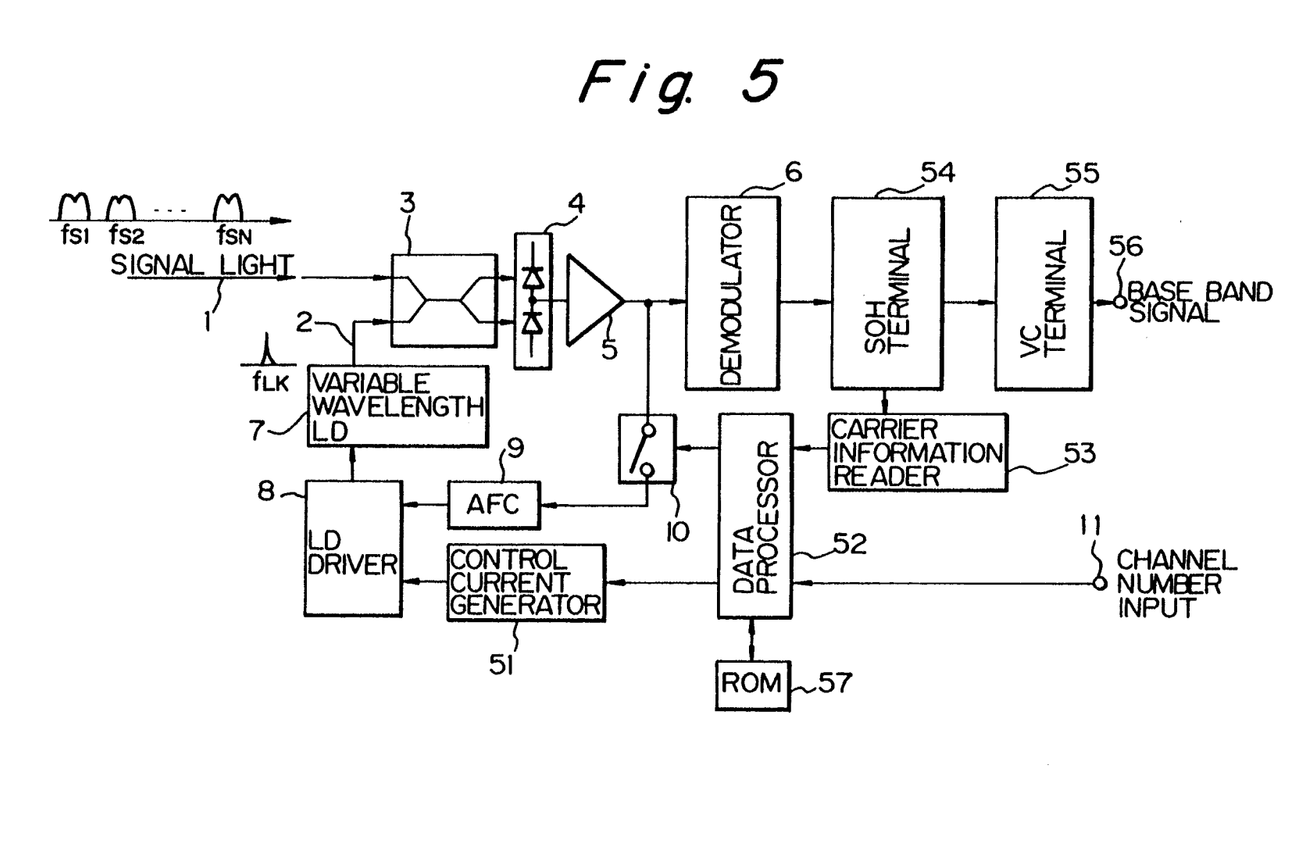
FIG. 5 is a block diagram indicating the construction of the first embodiment of a multiplex communication system of the present invention.

FIG. 5 is a block diagram indicating the first embodiment of the present invention. Structural elements identical to or corresponding to those of the conventional system shown in FIG. 1 are designated by the same reference numerals.

In FIG. 5, a laser beam frequency control current generating circuit 51 is connected to data processor 52. The output of a carrier information reading circuit 53 is fed to data processor 52. The output of the demodulator 6 is connected to a baseband signal output terminal 56 through a section overhead terminal 54 and a virtual container terminal 55. Data processor 52 is also connected to memory 57 (for example, ROM) previously storing a control current-oscillation frequency relationship based on the characteristics of variable wavelength laser diode 7.

An operation will next be explained. Carrier information is written in the transmitting side by a method described later in a section overhead area within a signal frame. The carrier information is composed, for example, of the channel number of the signal frame in which the carrier information is written, the frequency of a carrier for transmitting the signal frame, all carrier frequencies $f_{S1}$-$f_{SN}$ being transmitted and channel numbers 1-N corresponding respectively to the carrier frequencies.

When a power source (not shown) is turned ON, switch 10 is closed and AFC circuit 9 operates to cause a desired channel within the locking range of AFC circuit 9 to be received. In this case, carrier information reading circuit 53 reads the information within the section overhead from section overhead terminal 54 thereby enabling data processor 53 to detect all carrier frequencies $f_{S1}$-$f_{SN}$ currently transmitted, channel numbers 1-N corresponding to tile respective carrier frequencies, channel number m of the signal currently received and carrier frequency $f_{Sm}$ of the received channel.

When a number k of the channel to be selected is input from channel number input terminal 11, data processor 52 compares channel number m of the currently received channel and target channel number k based on the carrier information sent from carrier information reading circuit 53. When m=k, data processor 52 holds switch 10 in a closed position in order to enable the receiving side to continuously receive the signal. When m is different from k, data processor 52 turns OFF the switch 10 to cancel the operation of AFC circuit 9. Next, data processor 52 obtains carrier frequency $f_{sk}$ of input channel number k from the carrier information and searches which value beam frequency $f_{LK}$ of variable wavelength laser diode 7 should be set in order to receive the target channel. When beam frequency $f_{LK}$ of the laser beam to be generated by LD 7 is decided, data processor 52 reads a value of control current $i_k$ to be given to variable wavelength LD 7 from memory 57 and gives such a value to beam frequency control current generating circuit 51. Depending on this value, control current generating circuit 51 gives control current $i_k$ to LD driving circuit 8. Thereafter, data processor 52 turns ON switch 10 again to operate AFC circuit 9 and a new channel is received under this condition. The thus received signal is demodulated by demodulator 6 and is applied to carrier information reading circuit 53 through section overhead terminal 54, thereby reading the received channel number. When the received channel number coincides with the target input channel number k, tuning is completed.

Figure 6:
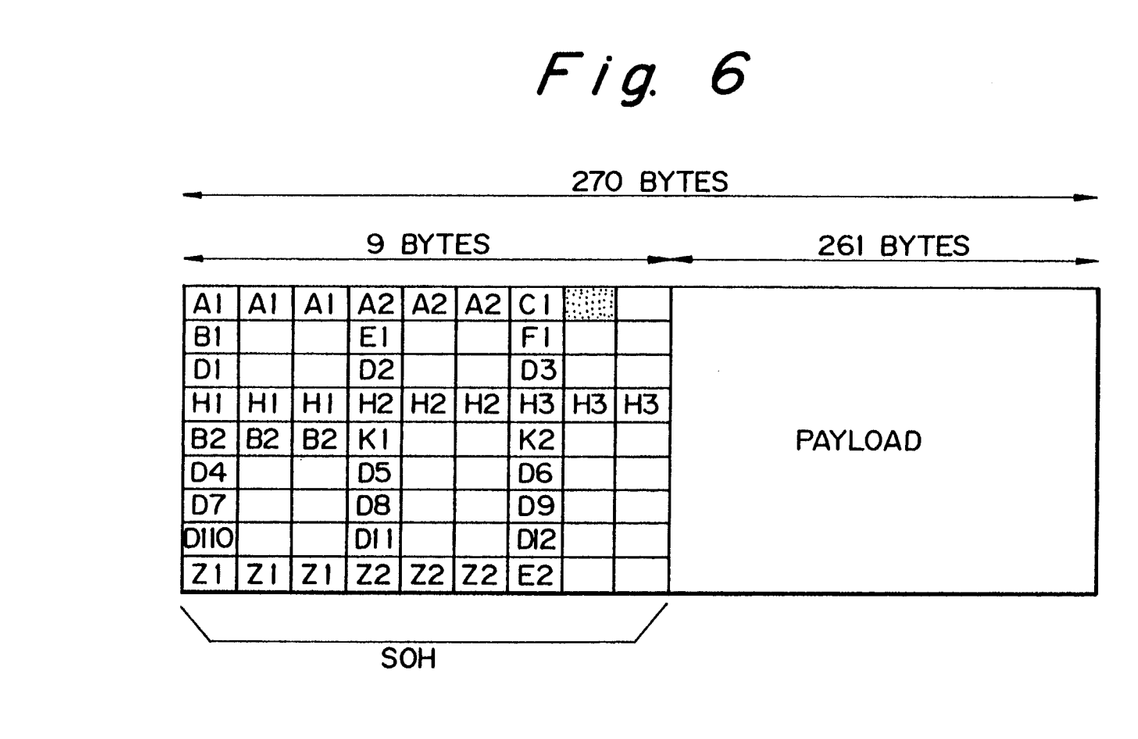
FIG. 6 is a diagram indicating a frame format where carrier information is written.

FIG. 6 is a diagram indicating a frame format in which the carrier information is written. This figure indicates an example of writing the carrier information in unused bytes of the STM-1 frame which is used for synchronous digital hierarchy in the network node interface standardized by CCITT. In this figure, the byte indicated as the black area means the carrier information. In this first embodiment, section overhead terminal 54 establishes the frame synchronization and carrier information reading circuit 53 is so constructed that it can detect, by reading the carrier information, the channel number of the signal frame in which the carrier information is written, the frequency of the carrier which carries the signal frame, all carrier frequencies $f_{S1}-f_{SN}$ being transmitted and channel numbers 1-N corresponding respectively to the carrier frequencies.

Figure 7:
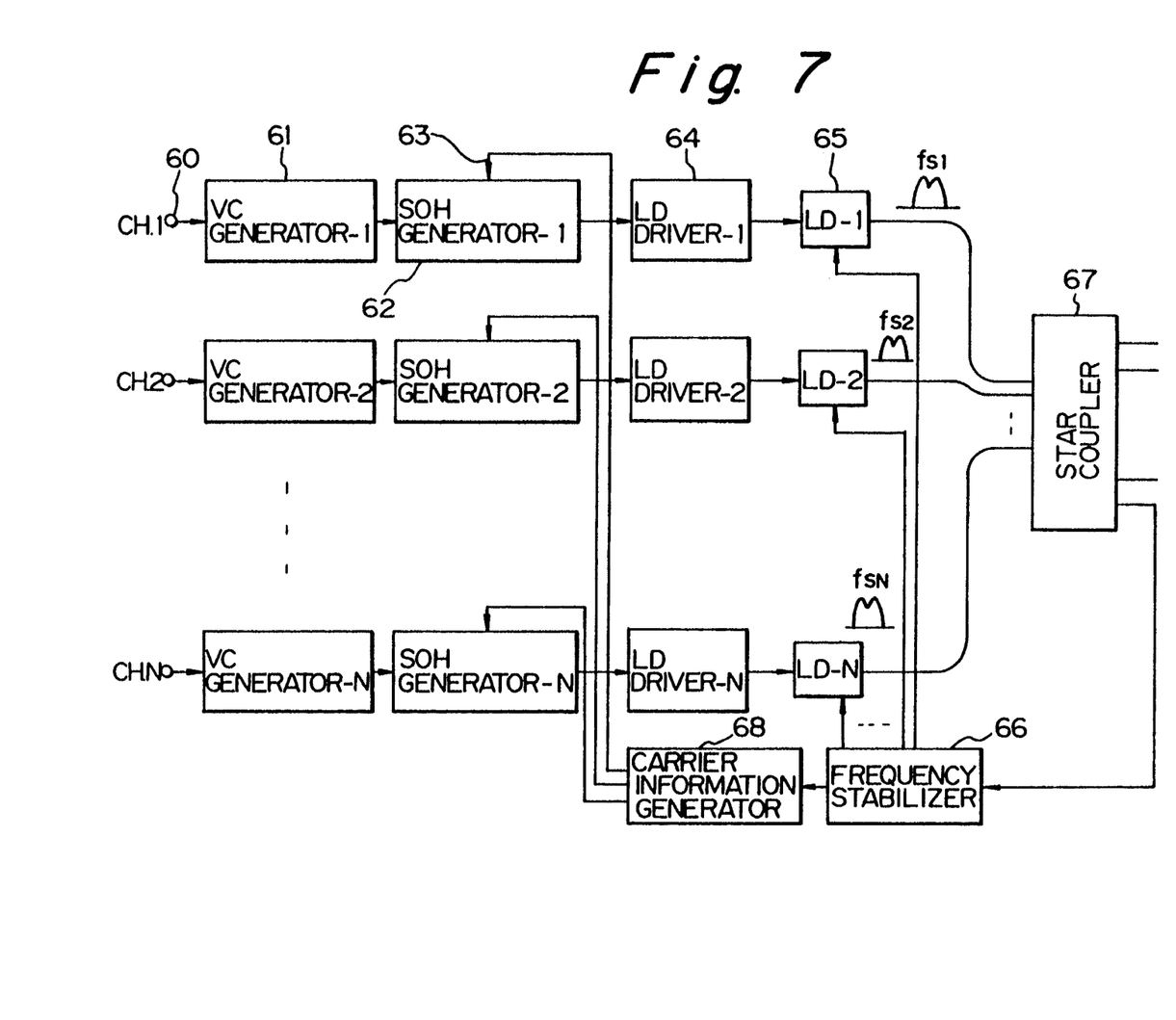
FIG. 7 is a block diagram indicating the construction of a transmitting section in the system shown in FIG. 5.

FIG. 7 is a block diagram of a transmitting section in the first embodiment of the present invention. This transmitting section operates to write the carrier information in the STM-1 frame of each channel and frequency-division multiplex the respective channel signals. In FIG. 7, since the structural elements of each channel are identical, an explanation will be made only about channel 1.

60 denotes a baseband signal input terminal of channel 1; 61 a virtual container generating circuit; and 62 a section overhead generating circuit an input terminal 63 of which carrier information 1 is applied to. 64 is an LD driving circuit; 65 an LD which receives the output of a beam frequency stabilizing circuit 66 and is connected to a star coupler 67. The carrier information is generated by circuit 68.

An operation of the transmitting section will be explained with reference to FIG. 7.

The baseband signal of channel 1 is applied to input terminal 60 and virtual container generating circuit 61 generates a standardized payload. An overhead for delivering network operation and management information is added in section overhead generating circuit 62. Simultaneously, the carrier information is written in the unused bytes of the section overhead. The individual laser diodes for the respective channels are controlled by beam frequency stabilizing circuit 66 so that the oscillation frequencies of the LDs are determined to be arranged at a constant frequency interval. The beams output from the laser diodes frequency-modulated with the baseband signals of the respective channels are combined in star coupler 67 and are then transmitted to the transmission line.

Carrier information includes, for example, a channel number of the signal frame in which the carrier information is written, the frequency of the carrier carrying the signal frame, all carrier frequencies $f_{S1}-f_{SN}$ being transmitted and channel numbers 1-N corresponding to the carrier frequencies. The carrier information of each channel is generated by carrier information generating circuit 68. The oscillation frequencies of the respective LDs detected by utilizing a frequency standard built in beam frequency stabilizing circuit 66 are sent to carrier information generating circuit 68 corresponding to the respective channel numbers. Circuit 68 generates carrier information of each channel having a format to be written in the section overhead.

In accordance with a frame signal of channel 1 thus formed, LD driving circuit 64 drives laser diode 65 for channel 1 to modulate the oscillation frequency thereof. Similar operations are carried out in channels 2-N.

Figure 8:
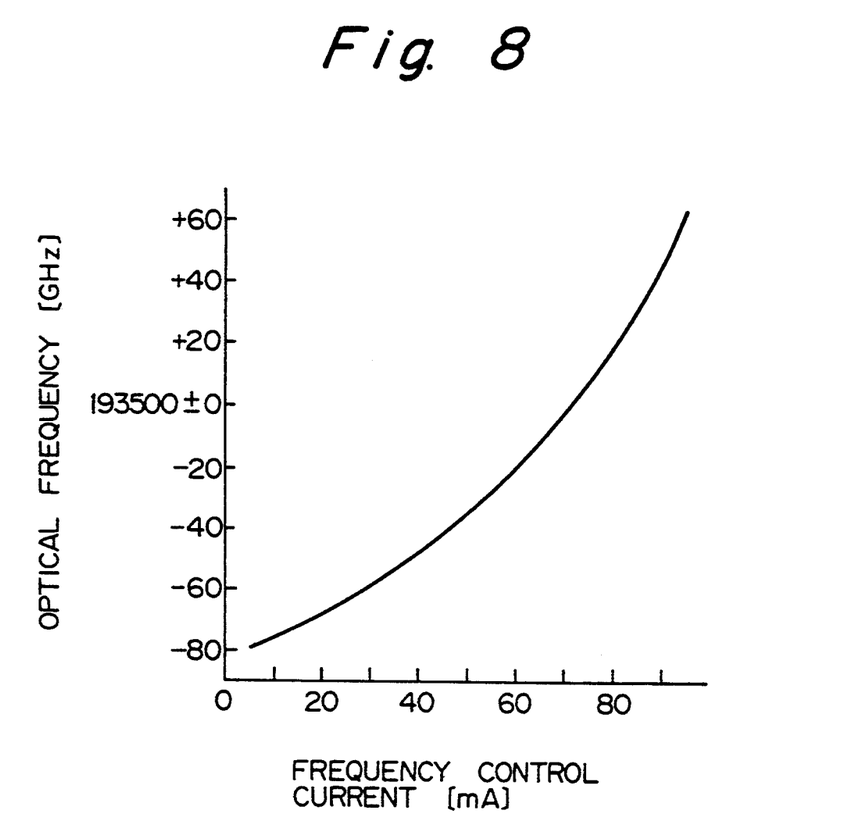
FIG. 8 is a graph indicating a control current-oscillation frequency characteristic of a variable wavelength laser diode stored in a memory of FIG. 5.

FIG. 8 shows a control current vs. oscillation frequency characteristic of the variable wavelength LD and which is stored in memory 57. The oscillation frequencies of the variable wavelength LD as the control current is changed have been measured and stored in memory 57. Accordingly, memory 57 outputs a value of control current corresponding to a beam frequency when the memory is addressed by an arbitrary beam frequency.

In this embodiment, the carrier information includes a beam frequency as one of the structural elements, but a similar result can be obtained when the wavelength of a laser beam is used in place of the beam frequency.

As explained above, according to the first embodiment of the present invention, a means for writing carrier information in a signal frame is provided in the transmitting side, while a memory for storing a frequency control signal vs. oscillation beam frequency relationship is provided in the receiving side. Control information required for selection of a target channel can be detected using the carrier information read out from the signal transmitted form the transmitting side and the control characteristic previously stored in the memory. The target channel is selected using such detected control information. Accordingly, channel selection can be realized within a short period of time without any malfunction regardless of what other channel information is received and any temporarily lowering of the receiving level.

Figure 9:
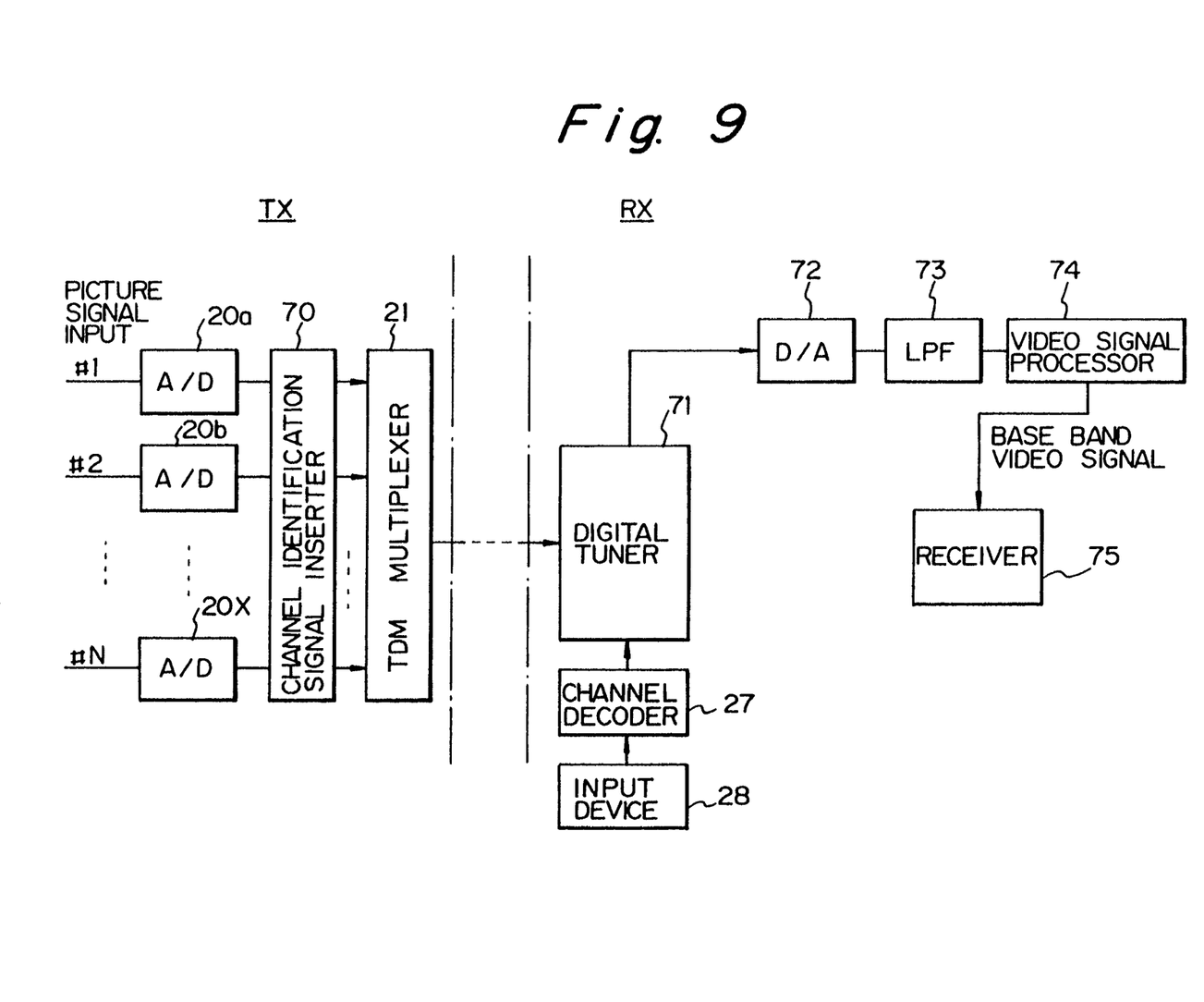
FIG. 9 is a block diagram indicating the construction of the second embodiment of a multiplex communication system of the present invention.

Next, the second embodiment of the present invention will be explained. The second embodiment relates to a time-division-multiplex communicating system. FIG. 9 is a block diagram indicating the construction thereof. Structural elements similar to those of FIG. 3 are designated by the same reference numerals and explanations thereof are omitted here.

In FIG. 9, tile reference numeral 70 denotes a channel identification signal inserter provided between A/D converters 20a-20x and TDM multiplexing apparatus 21 in the transmitting side in order to insert a channel code (channel identification signal), which serves to identify the channel of a video signal in a digital video signal of each channel; and 71 a digital tuner for processing a time-division multiplex digital video signal input to the receiving side and for selectively outputting the video signal of a desired channel to a subscriber. A detailed construction of digital tuner 71 is shown in FIG. 10 and will be explained later. 72 denotes a D/A converter for converting a digital video signal from digital tuner 71 to an analog signal; 73 a low-pass filter (LPF) for removing harmonics having no relation to a video signal from the output of D/A converter 72; 74 a video signal processing circuit for reproducing a baseband video signal from the output of LPF 73; and 75 a video signal receiver for reproducing a video signal by receiving the reproduced baseband video signal.

An operation will next be explained. Time-division multiplexing N-channel video signal as shown in FIG. 9 will be considered first. The input parallel N-channel video signals are converted to digital signals by M-bit A/D converters 20a-20x and then applied to channel identification signal inserter 70. In channel identification signal inserter 70, different channel identification codes are inserted to signal frames for the respective channels. Each channel identification code is formed, for example, by a binary representation of any one of the numerals from 1 to N and inserted to a fixed position with respect to the head of the frame, for example, in unused bytes among the bytes assigned for maintenance of each channel. The output of channel identification signal inserter 70 is time-division multiplexed by TDM multiplexing apparatus 21 and is transmitted to the transmission line as a serial signal.

In the receiving side, a digital video signal of the channel matching with the channel selection signal which is input by a subscriber from input unit 28 and is converted by channel decoder 27 is selected by digital tuner 71 from the received multiplexed video signal and is then output to M-bit D/A converter 72. In M-bit D/A converter 72, the input digital video signal is first converted to an analog video signal and is then output to LPF 73. In LPF 73, unwanted harmonics are removed from the input analog video signal and only the required video signal is output to video signal processing circuit 74. In video signal processing circuit 74, a baseband video signal is reproduced and the desired video signal is output to a subscriber in video signal receiver 75.

Figure 10A:
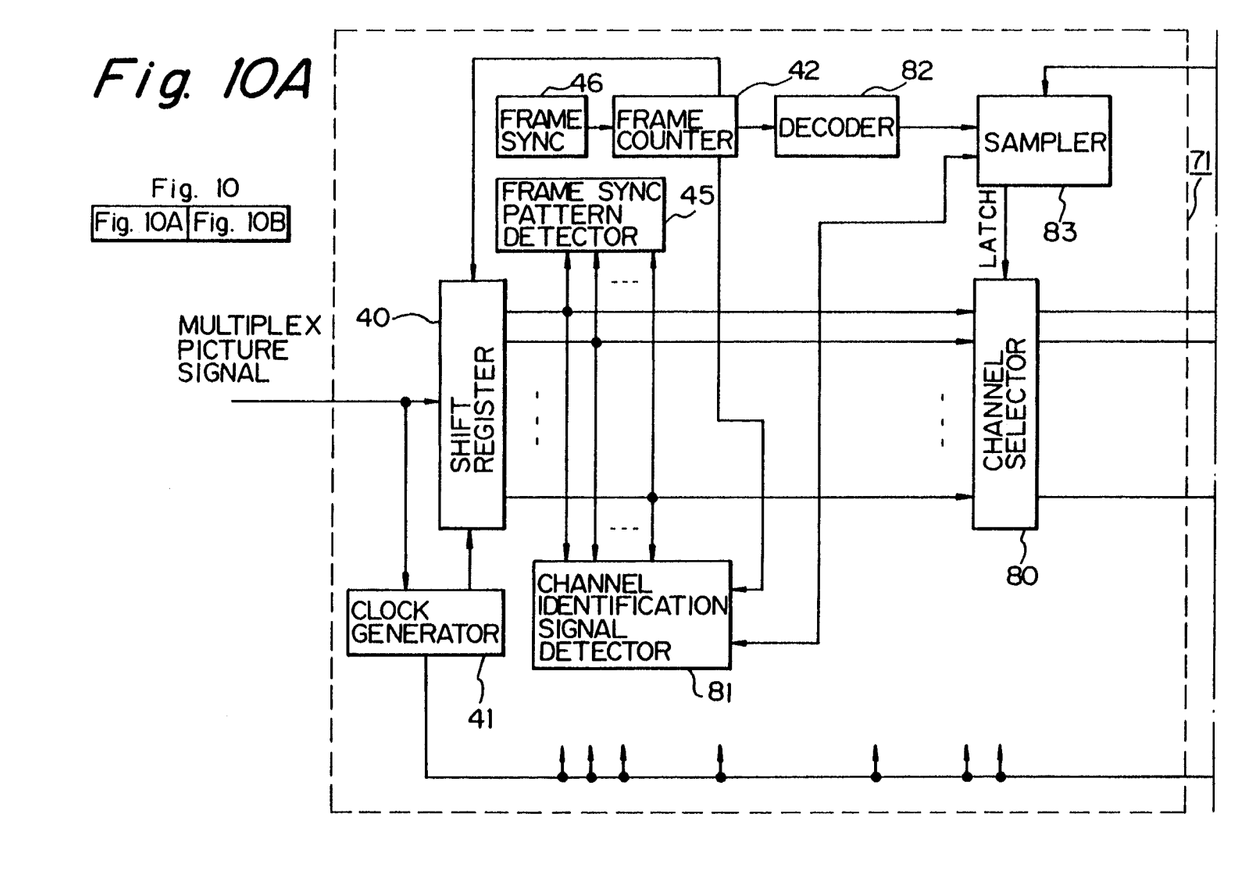
Figure 10B:
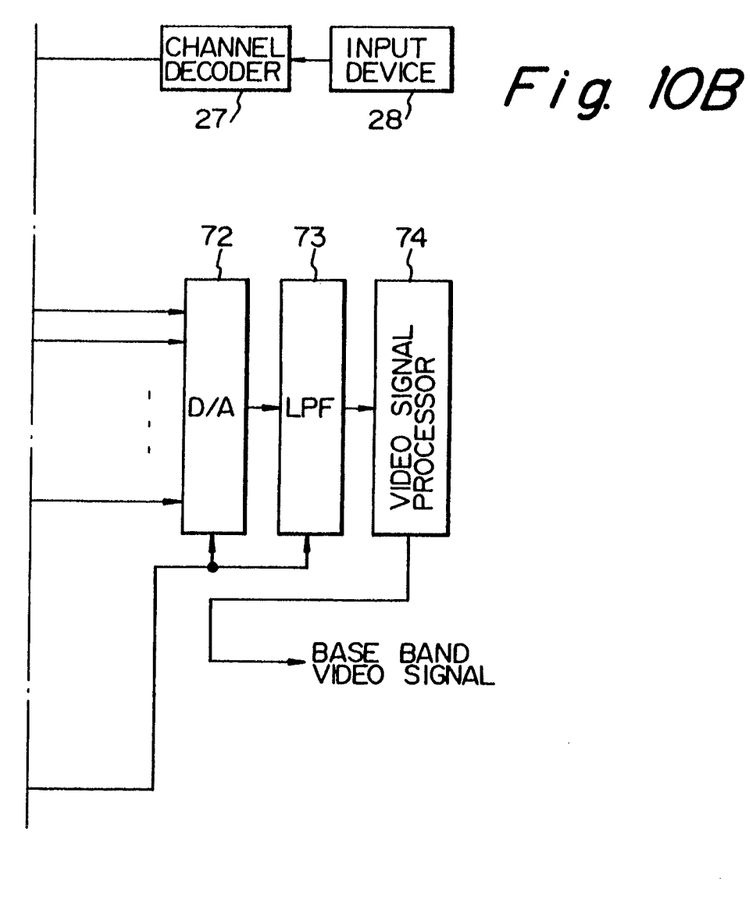

FIG. 10 is a block diagram indicating the construction of digital tuner 71 shown in FIG. 9. In this figure, the structural elements similar to those in FIG. 4 are denoted by similar reference numerals and an explanation is omitted here.

In FIG. 10, the reference numerals 80 denotes a channel selector which removes a frame synchronization pattern from parallel data output from shift register 40, conducts velocity conversion on the parallel data and latches the video signal of a desired channel in accordance with an input latch pulse; 81 a channel identification signal detector for extracting a channel identification signal from M-bit parallel data sent from shift register 40; 82 a decoder for decoding the output of frame counter 42; and 83 a video signal sampling circuit for generating a channel latch pulse based on the output of channel decoder 27, channel identification signal detector 81 and decoder 82.

TDM multiplexing apparatus 21 operates in a manner similar to that of the conventional system explained with reference to FIG. 3 and an explanation thereof is not repeated. An operation of digital tuner 71 will be explained with reference to FIG. 10. First, a received multiplexed video signal of a serial format is branched to two routes. One of the branched video signals is input to shift register 40 for parallel conversion. The parallel output of shift register 40 is branched to three routes. The first of the three branched signals is input to frame synchronization pattern detector 45 for detection of synchronization pattern to enable frame synchronization circuit 46 to establish a frame synchronization. When the frame synchronization pattern is detected by frame synchronization pattern detector 45, a shift pulse is output from frame counter 42 and shifts the data contained in shift register 40 so as to cause parallel data to be output therefrom in a regular sequence. The other of the branched video signal is input to clock generating circuit 41 and a clock component is extracted to control shift register 40. Clock generating circuit 41 also generates frequency-divided clocks for signal processing after the parallel conversion in shift register 40 and distributes the frequency-divided clocks to digital tuner 71 and other subsequent circuit sections. The output of shift register 40 is also input to channel identification signal detector 81. In channel identification signal detector 81, a channel identification signal is detected from the input signal from shift register 40 based on a frame pulse output from frame counter 42 when the frame synchronization has been established, and the result is output to video signal sampling circuit 83. In video signal sampling circuit 83, the result detected by channel identification signal detector 81 is compared with a channel selection signal which is input from input unit 28 by a subscriber and is decoded by channel decoder 27. When these signals coincide, a channel latch pulse is generated based on the output of decoder 82. When these do not coincide, video signal sampling circuit 83 outputs a channel shift signal to change the detection timing of channel identification signal detector 81 enabling the detection of channel identification signal of another channel. Decoder 82 decodes a count output of frame counter 42 to generate a standard pulse on the basis of which a channel latch pulse is generated. This reference pulse is shifted to latch a desired channel in video signal sampling circuit 83 and is output as a channel latch pulse. The output of shift register 40 is further input to channel selector 80 and the frame synchronization pattern is removed and subjected to velocity conversion and the channel requested by a subscriber is selected. Since channel selector 80 latches only one channel with the channel latch pulse sent from video signal sampling circuit 83, the video signal of the desired channel is output to a subscriber. When a channel change command from a subscriber is input to video signal sampling circuit 83, the previous channel latch pulse is held until a new channel latch pulse is established.

In the second embodiment of the present invention, input unit 28, by which a subscriber inputs a desired channel, is connected to digital tuner 71 through channel decoder 27. In digital tuner 71, a multiplexed video signal is processed digitally on the basis of the input signal without being subjected to any RF conversion and a desired channel signal is selectively output to a subscriber. Therefore, high quality images can be obtained using small scale circuits and a lower number of signal processing steps, and, moreover, a digital tuner circuit can easily be structured as LSI circuits. In addition, a commercially available television receiver can receive an image of NTSC system by providing an RF converting unit after video signal processing circuit 74.

In the second embodiment, the number of channels to be multiplexed and the number of parallel bits of each channel can be set to two or more.

Signals can be transmitted by way of electricity or light. In the case of using a laser beam, an E/O converter may be placed to convert a TDM signal to an optical signal, and an O/E converter may be placed to receive and convert the optical signal to an electrical signal to be supplied to digital tuner.

The channel identification signal and the channel selection signal may be any signals which can discriminate one channel from another and may not always be binary representations of the channel numbers. In addition, the channel identification signal can be inserted to an arbitrary position which is fixed with respect to the head of a frame.

In the above embodiment, the digital tuner has been constructed such as shown in FIG. 10, but the construction is not always restricted thereto. For example, it may be possible to include an input unit, a channel decoder, an LPF, a D/A converter and a video signal processing circuit in the digital tuner. An O/E converter may further be included in the digital tuner when optical transmission and reception are carried out.

As explained above, the present invention offers higher quality video images to subscribers by changing only a small number of elements in a conventional transmitter and enables television receivers to be more economical and smaller.

What is claimed is:

1. A multiplex communication system for transmitting different signals through a plurality of channels comprising:
    transmitting means including a transmitting section for multiplexing and transmitting the signals through the plurality of channels, and adding means for adding channel identification signals for identifying the respective channels to the signals to be transmitted through the respective channels, the adding means including means for adding channel numbers to the signals to be transmitted through the respective channels, and the adding means further including means for adding information identifying a frequency at which a channel is transmitted; and
    receiving means including setting means for setting a desired channel, for detecting means for detecting the channel identification signals from the signals transmitted from said transmitting means including means for detecting the channel number and means for detecting the frequency at which a channel is transmitted, and channel selecting means for selecting the signal of the channel set by said setting means in accordance with the outputs of said setting means and said detecting means.

2. A system as recited in claim 1, wherein the means for adding further comprises:
    means for adding information indicative of a correspondence between channels and frequencies at which channels are transmitted.

3. A frequency-division multiplex communication system for communicating over a transmission line comprising:
    transmitting means comprising a frequency-division multiplex transmitting section for frequency-division multiplexing and transmitting digital signals of a plurality of channels to the transmission line in the form of a frame, and inserting means for inserting carrier information for identifying the respective channels to predetermined areas of the respective frames, the inserting means including means for inserting channel numbers to the signals to be transmitted through the respective channels, and the inserting means further including means for inserting information identifying a frequency at which a channel is transmitted; and
    receiving means comprising a receiving section for receiving the frequency-division multiplexed digital signals from the transmission line, reading means for reading the carrier information out of the digital signals received by said receiving section including means for reading the channel number and means for reading the frequency at which a channel is transmitted, setting means for setting a desired channel, and oscillating means for oscillating a frequency determined by the outputs of said reading means and said setting means, thereby receiving the digital signal of the channel preset by said setting means utilizing the frequency produced by said oscillating means.

4. A frequency-division multiplex communication system according to claim 3, wherein said digital signals are transmitted from said transmitting means to said receiving means by light, said oscillating means comprises a variable wavelength laser diode which radiates a local oscillation laser beam, and said receiving section comprises a photocoupler which receives a signal beam transmitted from said transmitting means at one input and also receives the local oscillating signal beam from said laser diode at another input, arithmetic means responsive to the outputs of said reading means and said setting means for outputting the signal for computing an oscillation frequency of said laser diode which is required to extract the signal of the channel preset by said setting means so as to output a signal designating the oscillation frequency, and driving means for driving said laser diode in accordance with designating signal.

5. A frequency-division multiplex communication system according to claim 4, further comprising a memory storing a relationship between the oscillation frequency of said laser diode and a current driving said laser diode, and wherein said arithmetic means is a microprocessor which computes a frequency to be oscillated by said laser diode in response to the outputs of said setting means and said reading means to output the designating signal by reading a current corresponding to the frequency from said memory.

6. A system as recited in claim 3, wherein the means for inserting further comprises:
    means for inserting information indicative of a correspondence between channels and frequencies at which channels are transmitted.

* * * * *